US009143701B2

(12) United States Patent
Muraki et al.

(10) Patent No.: US 9,143,701 B2
(45) Date of Patent: Sep. 22, 2015

(54) IMAGING APPARATUS CAPABLE OF SPECIFYING SHOOTING POSTURE, METHOD FOR SPECIFYING SHOOTING POSTURE, AND STORAGE MEDIUM STORING PROGRAM

(71) Applicant: CASIO COMPUTER CO., LTD., Shibuya-ku, Tokyo (JP)

(72) Inventors: Jun Muraki, Hamura (JP); Hiroshi Shimizu, Tachikawa (JP); Hiroyuki Hoshino, Ome (JP); Erina Ichikawa, Sagamihara (JP); Hiroyuki Kato, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 73 days.

(21) Appl. No.: 13/787,770

(22) Filed: Mar. 6, 2013

(65) Prior Publication Data
US 2013/0235229 A1  Sep. 12, 2013

(30) Foreign Application Priority Data

Mar. 7, 2012  (JP) ................................. 2012-050005

(51) Int. Cl.
H04N 5/225 (2006.01)
H04N 5/262 (2006.01)
H04N 5/232 (2006.01)

(52) U.S. Cl.
CPC ............. *H04N 5/2628* (2013.01); *H04N 5/232* (2013.01); *H04N 5/23258* (2013.01)

(58) Field of Classification Search
CPC ................... H04N 2201/3254; H04N 5/2201; H04N 5/3254; H04N 5/23248; H04N 5/23258; G03B 5/00

USPC ...................................................... 348/207.99
See application file for complete search history.

(56) References Cited

U.S. PATENT DOCUMENTS

| 5,227,889 A * | 7/1993 | Yoneyama et al. ........ 348/208.6 |
| 5,499,074 A * | 3/1996 | Ohsawa et al. ............... 396/121 |
| 6,781,612 B1 * | 8/2004 | Detig ............................ 347/112 |

(Continued)

FOREIGN PATENT DOCUMENTS

| JP | 05-037887 A | 2/1993 |
| JP | 2000-312329 A | 11/2000 |
| JP | 2005-175952 A | 6/2005 |
| WO | 2006/100804 A1 | 9/2006 |

OTHER PUBLICATIONS

Japanese Office Action dated Oct. 29, 2013 (and English translation thereof) issued in counterpart Japanese Application No. 2012-160576.

(Continued)

*Primary Examiner* — Ahmed A Berhan
(74) *Attorney, Agent, or Firm* — Holtz, Holtz, Goodman & Chick PC

(57) ABSTRACT

There is provided an imaging apparatus including an imaging unit, an orthogonal axis information detecting unit that detects orthogonal axis information indicating an inclination of an orthogonal axis perpendicular to an optical axis of the imaging unit after imaging by the imaging unit, and a specifying unit that specifies a shooting posture of an apparatus body at time of imaging, based on the orthogonal axis information detected by the orthogonal axis information detecting unit.

16 Claims, 6 Drawing Sheets

(56) References Cited

U.S. PATENT DOCUMENTS

| | | | |
|---|---|---|---|
| 6,781,622 B1 * | 8/2004 | Sato et al. | 348/208.4 |
| 7,375,755 B2 * | 5/2008 | Oya et al. | 348/333.02 |
| 8,031,240 B2 | 10/2011 | Yumiki | |

OTHER PUBLICATIONS

Japanese Office Action dated Jan. 28, 2014 (and English translation thereof) in counterpart Japanese Application No. 2012-160576.

* cited by examiner

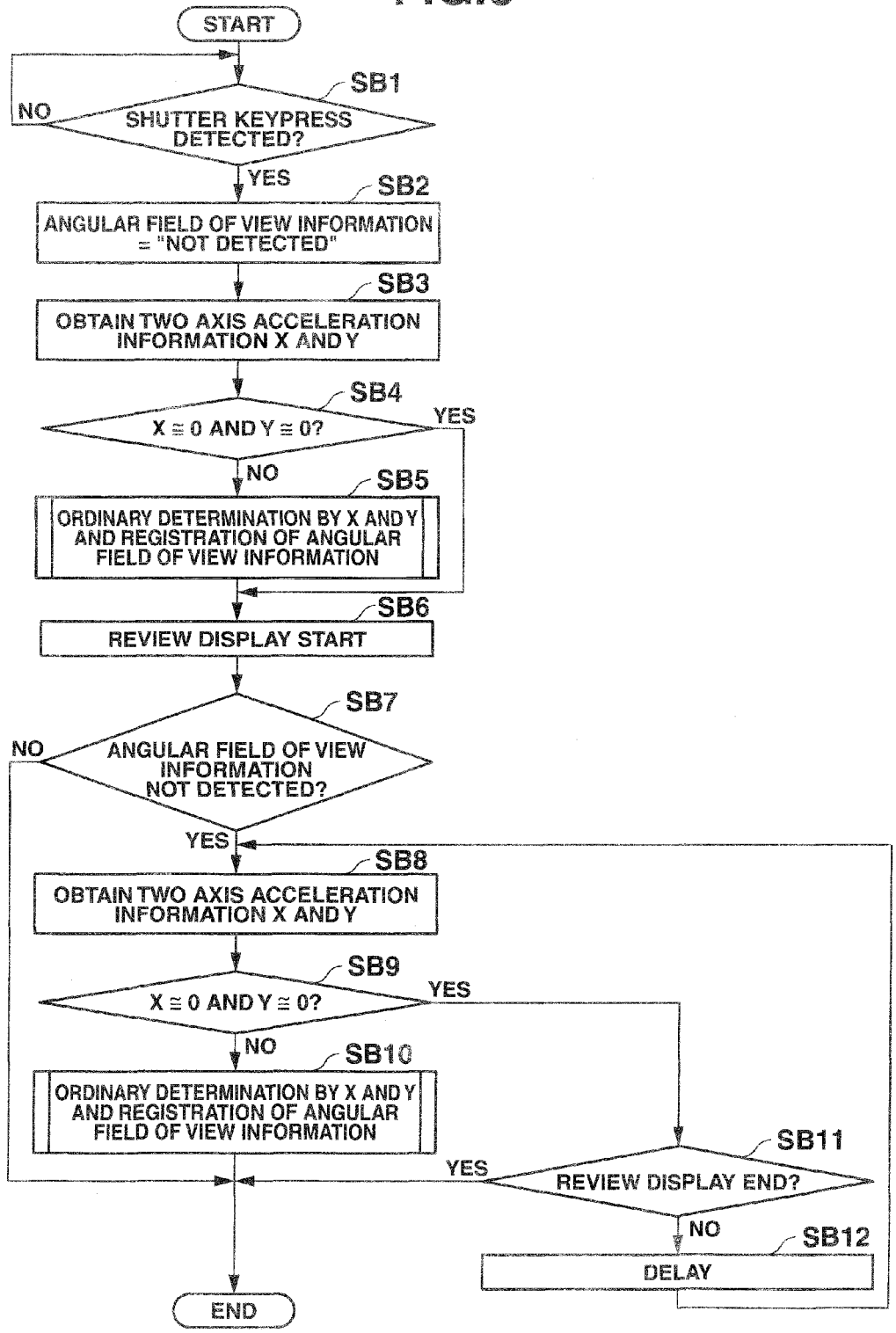

IMAGING APPARATUS CAPABLE OF SPECIFYING SHOOTING POSTURE, METHOD FOR SPECIFYING SHOOTING POSTURE, AND STORAGE MEDIUM STORING PROGRAM

CROSS-REFERENCE TO RELATED APPLICATIONS

This application is based upon and claims the benefit of priority from prior Japanese Patent Application No. 2012-050005, filed Mar. 7, 2012, the entire contents of which are incorporated herein by reference.

BACKGROUND OF THE INVENTION

1. Field of the Invention

The present invention relates to an imaging apparatus suitably used in a digital camera, a method for specifying shooting posture, and a storage medium storing a program.

2. Description of the Related Art

Images captured by ordinary digital cameras conventionally have an aspect ratio of 4:3 or 16:9. Since the aspect ratio of 1:1 is not used, imaging is available in different postures, for example, so-called vertical position shooting and horizontal position shooting. However, when a captured image is reproduced, the image ordinarily appears turned in the same direction as imaged by the above-mentioned horizontal position shooting. Therefore, when images captured by the vertical position shooting are reproduced, the images each need to be turned by 90 degrees one by one before reproduction.

As a method for saving such a laborious process as described, Jpn. Pat, Appln. KOKAI Publication No. 2000-312329 discloses a technology that the posture (vertical, position shooting or horizontal position shooting) of a camera body is detected prior to imaging (capturing) and is then recorded as additional information added to a captured image. When the image is reproduced, the orientation of the image is checked, based on the additional information. For an image to be positioned vertically, the image is automatically turned by 90 degrees.

BRIEF SUMMARY OF INS INVENTION

According to one aspect of the present invention, there is provided an imaging apparatus comprising: an imaging unit; an orthogonal axis information detecting unit that detects orthogonal axis information indicating an inclination of an orthogonal axis perpendicular to an optical axis of the imaging unit after imaging by the imaging unit; and a specifying unit that specifies a shooting posture of an apparatus body at time of imaging, based on the orthogonal axis information detected by the orthogonal axis information detecting unit.

According to another aspect of the present invention, there is provided a shooting posture specifying method comprising: detecting an inclination of orthogonal axis information indicating an inclination of an orthogonal axis perpendicular to an optical axis of an imaging unit; and specifying a shooting posture of the apparatus body at time of imaging, based on the detected orthogonal axis information.

According to still another aspect of the present invention, there is provided a non-transitory computer-readable storage medium having a program stored thereon which controls a computer in an imaging apparatus including an imaging unit, to perform functions comprising: an orthogonal axis information detecting unit that detects orthogonal axis information indicating an inclination of an orthogonal axis perpendicular to an optical axis of the imaging unit after imaging by the imaging unit; and a specifying unit that specifies a shooting posture of an apparatus body at time of imaging, based on the orthogonal axis information detected by the orthogonal axis information detecting unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a flowchart showing operation of the digital camera in the second embodiment.

DETAILED DESCRIPTION OF THE INVENTION

Hereinafter, embodiments of the invention will be described with reference to the drawings.

(Embodiment 1)

Figure 1:
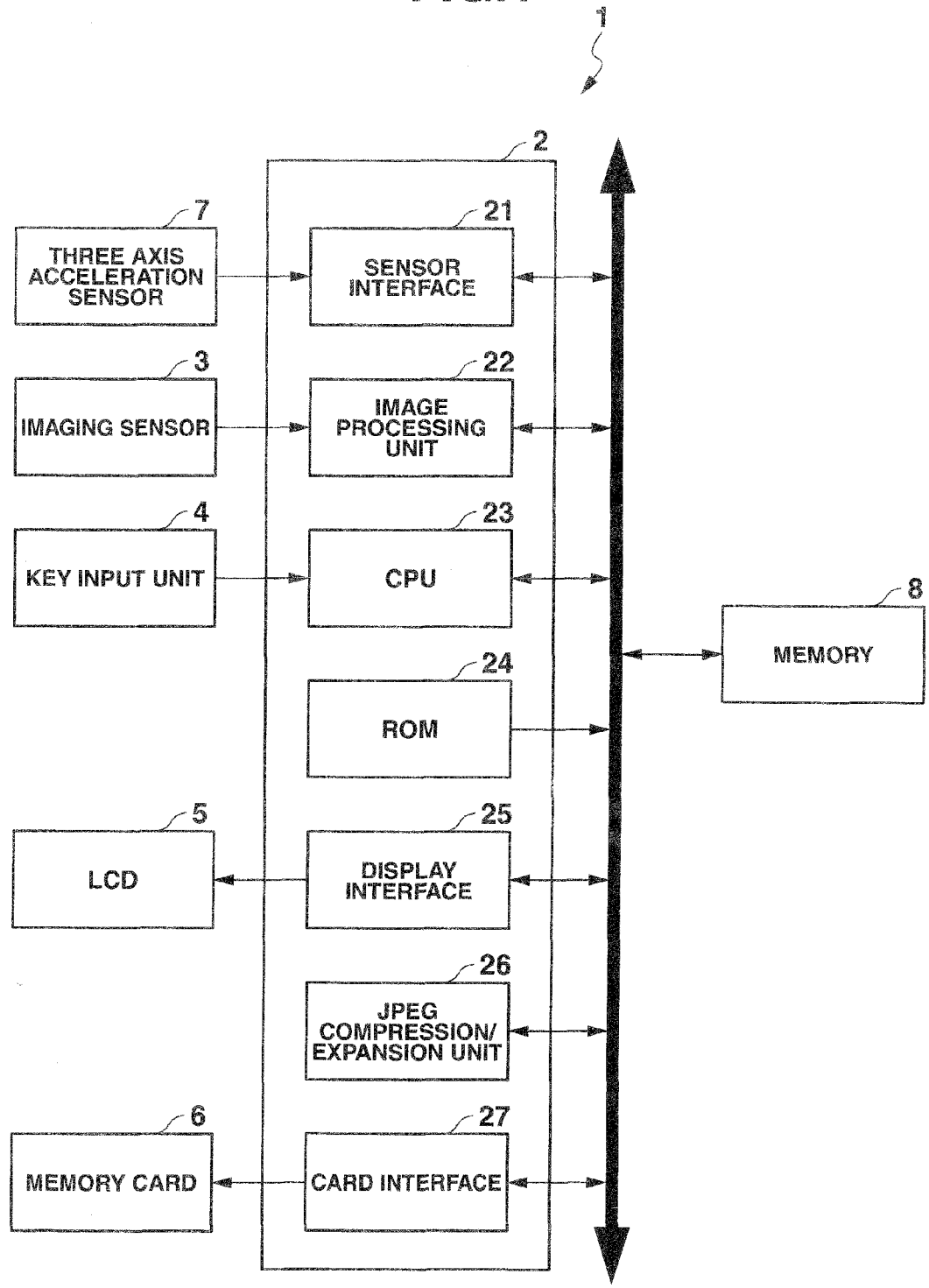
FIG. 1 is a block diagram of a digital camera as an imaging apparatus common to embodiments of the invention.

Hereinafter, the first embodiment of the invention will be described. FIG. 1 is a block diagram showing an example of the electronic configuration of a digital camera 1 as an imaging apparatus of the invention.

As shown in FIG. 1, the digital camera 1 comprises a camera LSI 2, an imaging sensor 3 connected to the camera LSI 2, a key input unit 4, a liquid crystal display (LCD) 5, a memory card 6, a three axis acceleration sensor 7, and a memory 8.

The camera LSI 2 comprises a sensor interface 21, an image processing unit 22, a central processing unit (CPU) 23, a read-only memory (ROM) 24, a display interface 25, a JPEG compression/expansion unit 26, and a card interface 27.

The imaging sensor 3 is of a charge-coupled device (CCD) type or a complementary-metal-oxide semiconductor (CMOS) type, and feeds an image signal to the image processing unit 22 with a predetermined cycle.

The image processing unit 22 comprises an analog front end (ARE) which performs analogue processing such as noise reduction and conversion into a digital signal from an image signal fed from the imaging sensor 3, and a color process circuit which generates image data including color information from the converted digital signal. The image processing unit 22 outputs the generated image data to the memory 8. The memory 8 is work random access memory (RAM) which temporarily stores various types of data.

The display interface 25 reads the image data on the memory 8 at a predetermined cycle, generates a video signal based on the image data, and supplies the image data to LCD 5. The LCD 5 displays an image based on the supplied video signal on a screen. That is, in imaging standby status, the LCD 5 displays a live view image updated sequentially.

The JPEG compression/expansion unit 26 reads image data stored into the memory 8 at the time of imaging and performs compression coding on the image data, according to the Joint Photographic Expert Group (JPEG) system. Thereafter, the unit 26 stores the image data into the memory 8.

Figure 2:
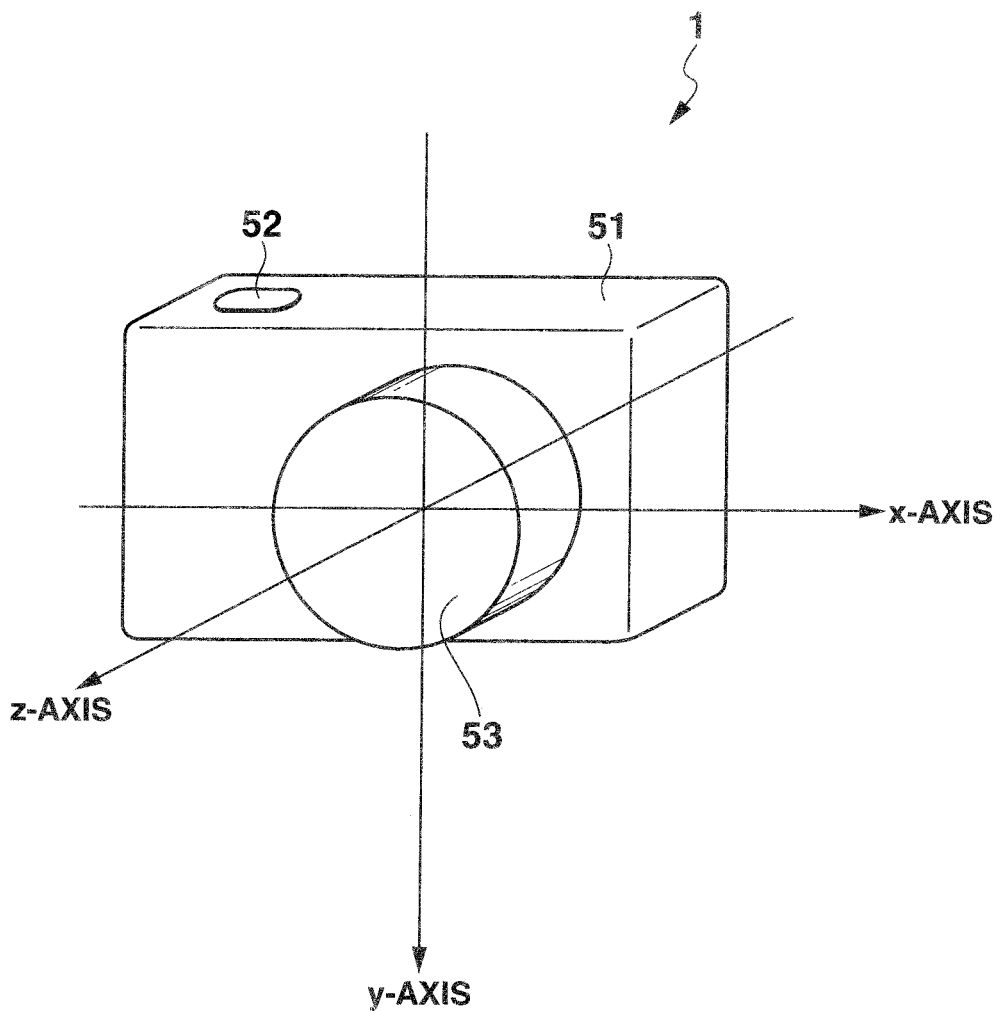
FIG. 2 shows a relationship between a digital camera body of and detection axes for acceleration components.

The compressed image data on the memory 8, i.e., captured image data is added with additional information, including date/time of imaging, an image size, etc., by the CPU 23. The image data is then stored through the card interface 27 into the memory card 6 as a still image file which complies with the Exchangeable Image File Format (Exit) standard or the like. The memory card 6 is, for example, a flash memory which can be freely detached from and attached to the camera body 51 (FIG. 2).

In the present embodiment, when storing captured image data as a still image file into the memory card 6, the CPU 23 also adds angular field of view information which specifies the direction of an angular field of view corresponding to a shooting posture of the camera body 51 at the time of imaging, i.e., a longitudinal direction and a width direction of the image obtained by the imaging.

The foregoing term "shooting posture" is intended to collectively express horizontal position shooting or vertical position shooting of the camera body 51 which is reflected on the directions of the angular field of view, excluding up and down directions of the camera body 51. In descriptions below, the posture of the camera body 51 including up and down directions is referred to as "posture", and is distinguished from the shooting posture.

For captured image data imaged in the horizontal position shooting, the angular field of view information indicates an angular field of view oriented to be horizontally long, and is referred to as "Landscape" in the present embodiment. For captured image data in the vertical position shooting, the angular field of view information indicates an angular field of view oriented to be vertically long, referred to as "Portrait" in the present embodiment.

Captured image data stored in the memory 8 at the time of imaging is read immediately after the imaging by the display interface 25, and is then displayed as a review image for a definite period to check an imaging result.

The captured image data stored as a still image file into the memory card 6 is read through the card interface 27 as needed, and is expanded (decoded) by the JPEG compression/expansion unit 26 and developed on the memory 8. The image data is then displayed as a reproduced image on the screen of LCD 5.

A key input unit 4 comprises a plurality of operation keys, such as a shutter key 52 (FIG. 2) and a mode switch key used for a switching between an imaging mode as a basic operation mode of the digital camera 1. Operation statuses of the operation keys in the key input unit 4 are monitored by the CPU 23 at any time.

The three axis acceleration sensor 7 comprises: a sensor which detects acceleration components in the three axis directions of x, y, and z, following the posture and motion of the camera body 51; an analog-to-digital converter which converts a detection signal from the sensor into a digital detection value; and a register which temporarily latches detection values. The detection values of the acceleration components in the three axes, which are detected by the three axis acceleration sensor 7, are read to the CPU 23 through the sensor interface 21. Each of the detection values in the respective axes is a positive value if the detection value is an acceleration component in one direction of the corresponding axis, or is a negative value if the detection value is an acceleration component in the other direction of the corresponding axis.

FIG. 2 shows a relationship between the camera body 51 and the detection axes x, y, and z of the three axis acceleration sensor 7 for the acceleration component. The three axis acceleration sensor 7 is arranged in the camera body 51 in a manner that the z-axis corresponds to the optical axis of an imaging lens 53, the x-axis corresponds to a width direction of a photosensitive plane of the imaging sensor 3 (the width direction of the angular field of view), and the y-axis corresponds to a longitudinal direction of the photosensitive plane (the longitudinal direction of the angular field of view).

The CPU 23 operates according to various programs stored in the ROM 24, and controls operations of respective parts of the camera LSI 2. The CPU 23 performs various operation processings on data on the memory 8, and stores results thereof into the memory 8. Further, at the time of imaging, the CPU 23 specifies the shooting posture, based on the detection values of the three axis acceleration sensor 7 at a time point when or after a user presses the shutter key, as will be described later. The CPU 23 also functions as a timer by counting time using an internal clock.

Figure 3:
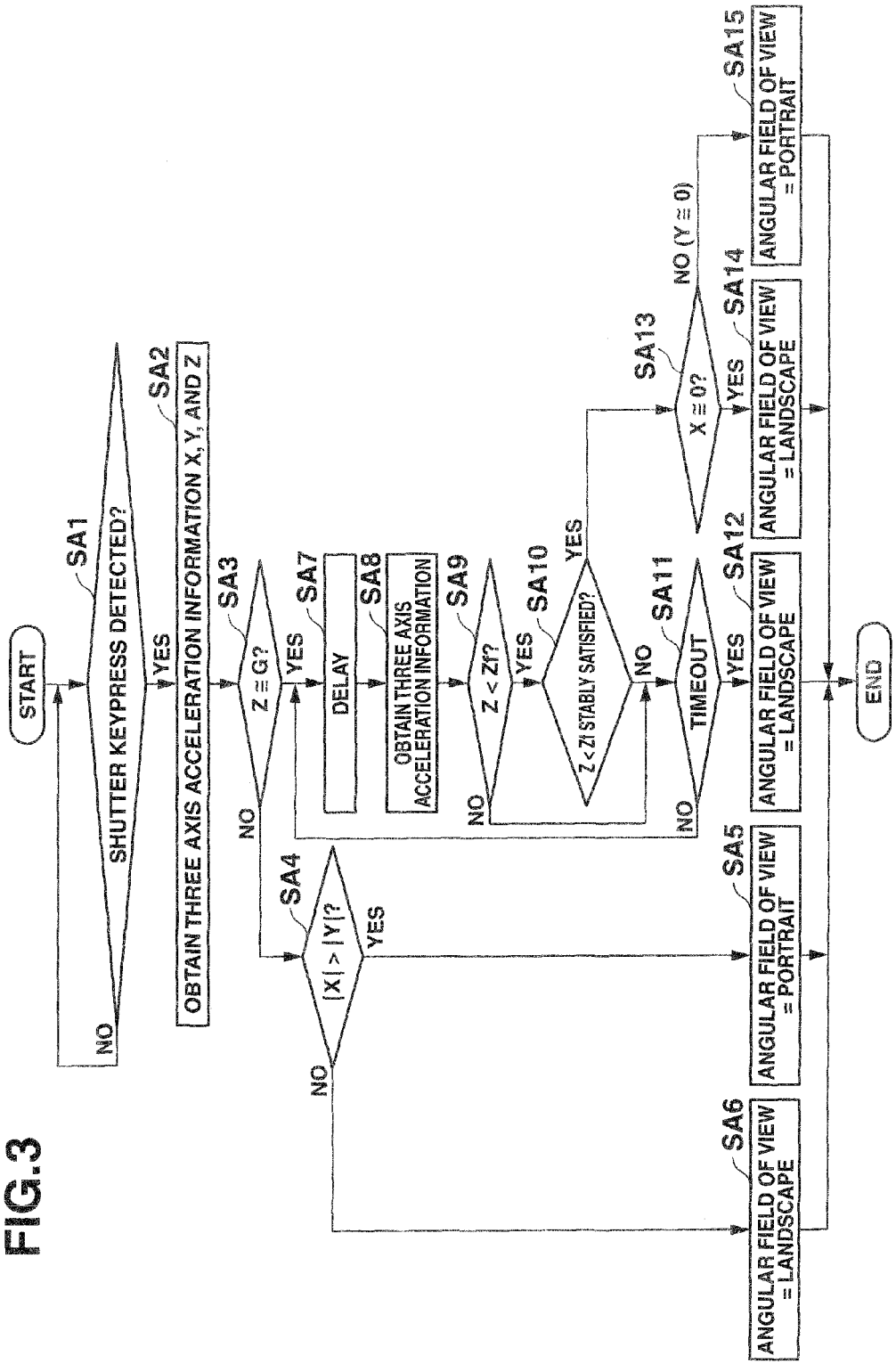
FIG. 3 is a flowchart showing operation of the digital camera in the first embodiment.

Hereinafter, a detailed process of specifying the shooting posture by the CPU 23 will be described along FIG. 3. FIG. 3 shows part of processings which are performed, based on a program stored in the ROM 24 by the CPU 23 in the imaging mode, and relate to specifying of the shooting posture.

When the CPU 23 detects a press on the shutter key by a user (Step SA1: YES) in the imaging mode, the CPU 23 performs imaging and immediately acquires three axis acceleration information (detection values: X, Y, and Z) as a resource to determine the posture of the camera body 51 at the time of imaging (step SA2). Although not shown in the drawings, the CPU 23 starts counting elapsed time from a press on the shutter key as the shutter key is pressed down.

Figure 4:
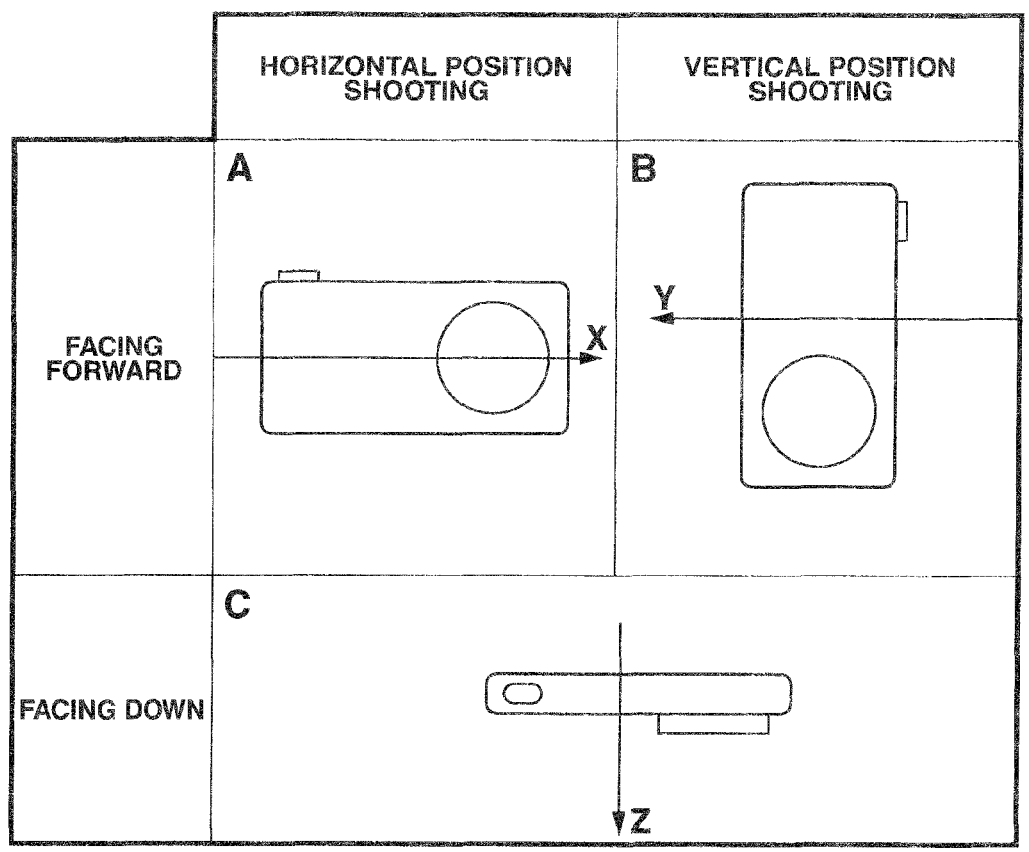
FIG. 4 shows positions of the digital camera body at the time of imaging.

Postures of the camera body 51 which can be determined directly from three axis acceleration information are a plurality of postures as shown in FIG. 4, for example, forward horizontal position shooting (posture denoted at A in FIG. 4), forward vertical position shooting (posture denoted at B in FIG. 4), and down shooting (posture denoted at C with FIG. 4).

After obtaining the three axis acceleration information, the CPU 23 using a detection value X of the x-axis as information indicating an inclination of the x-axis to a horizontal line, a detection value Y of the y-axis as information indicating an inclination of the y-axis to a perpendicular line, and a detection value Z of the z-axis as information indicating an inclination of the z-axis to a perpendicular line.

First, the CPU 23 checks whether or not detection value Z of the z-axis approximates to the acceleration due to gravity G (step SA3). The processing of Step SA3 as described is to determine whether or not a difference of detection value Z of the z-axis to the acceleration due to gravity G is not greater than a predetermined value and is not greater than a value at which the z-axis is regarded as substantially corresponding to the perpendicular line.

If detection value Z does not approximate to the acceleration due to gravity G, i.e., it the camera body 51 can be determined to face forward (Step SA3: NO), the CPU 23 checks whether or not the absolute value of detection value X of the x-axis is greater than the absolute value of detection value Y of the y-axis (step SA4).

If the absolute value of detection value X is greater than the absolute value of detection value Y (Step SA4: YES), the CPU 23 specifies the shooting posture of the camera body 51 to be the vertical position shooting, and sets "Portrait" indicating an angular field of view oriented to be vertically long, as angular field of view information added to the captured image data obtained by imaging for this time (step SA5).

Inversely, if the absolute value of detection value X is smaller than the absolute value of detection value Y (Step SA4: NO), the CPU 23 specifies the shooting posture of the camera body 51 to be the horizontal position shooting, and sets "Landscape" indicating an angular field of view oriented to be horizontally long, as angular field of view information added to the captured image data obtained by imaging for this time (step SA6).

Meanwhile, if detection value Z of the z-axis obtained by processing of step SA2 approximates to the acceleration due to gravity G, i.e., if the camera body 51 is determined to face down (Step SA3: YES), the CPU 23 cannot immediately determine the shooting posture of the camera body 51 at this time point, and therefore subsequently performs processings below.

Specifically, the CPU 23 newly acquires the three axis acceleration information (detection value: X, Y, Z) (Step SA8) after a definite waiting period (for example, 0.5 seconds) (step SA7), and checks whether or not a newly acquired detection value Z is smaller than a predetermined threshold value Zf (Step SA8). The threshold value Zf will be described in details later.

If detection value Z is smaller than the predetermined threshold value Zf (Step SA9: YES), the CPU 23 further checks whether the status of detection value Z being smaller than the predetermined threshold value Zf is stable for a definite time period (Step SA10).

In the processing of Step SA10, the CPU 23 counts the number of times detection value Z is sequentially checked to be either smaller than the predetermined value Zt or not in the processing of step SA9. If the number of times reaches a predetermined count, the status as described is determined to be stable for the definite time period. Therefore, in the processing of Step SA10 which is performed for the first time, only the number of times as described is counted.

The processing of Step SA10 is replaceable with a processing of counting elapsed time for which a detection value Z smaller than the predetermined threshold value Zf is continuously detected since first detection of such a detection value Z.

Thereafter, the CPU 23 repeats the processings of Steps SA7 to SA10 until the status of detection value Z being smaller than the predetermined threshold value Zf is stable for a definite time period (Step SA10: NO) unless elapsed time from imaging reaches a predetermined check time (Step SA11: NO).

The elapsed time from imaging, i.e., the elapsed time from imaging in the processing of Step SA1 may be elapsed time from an imaging operation.

The series of processings as described above are to detect that the posture of the camera body 51 which faced down at the time of imaging changes to a posture for visually check a review image within a predetermined time period immediately from the imaging and is stably maintained in this status. A predetermined check time is a duration (for example, 2 to 3 seconds) for which the review image is automatically displayed, for example.

Figure 5A:
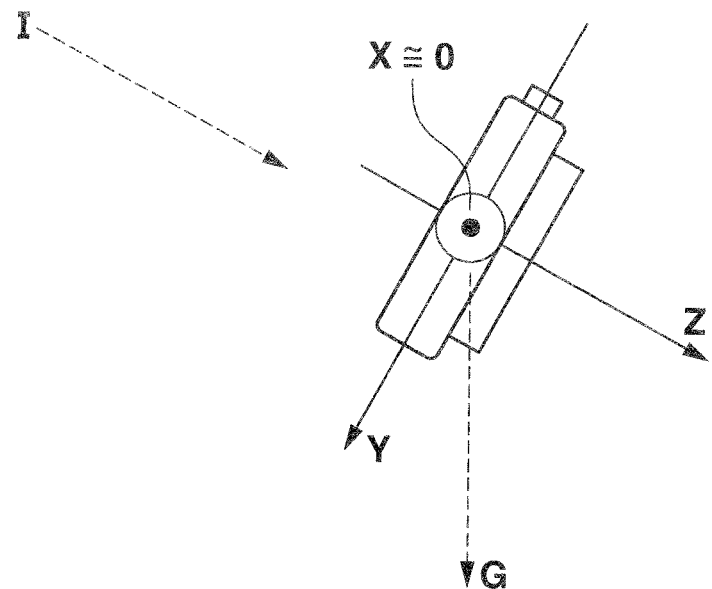
FIG. 5A and FIG. 5B show review check postures of the camera body immediately after imaging.
Figure 5B:
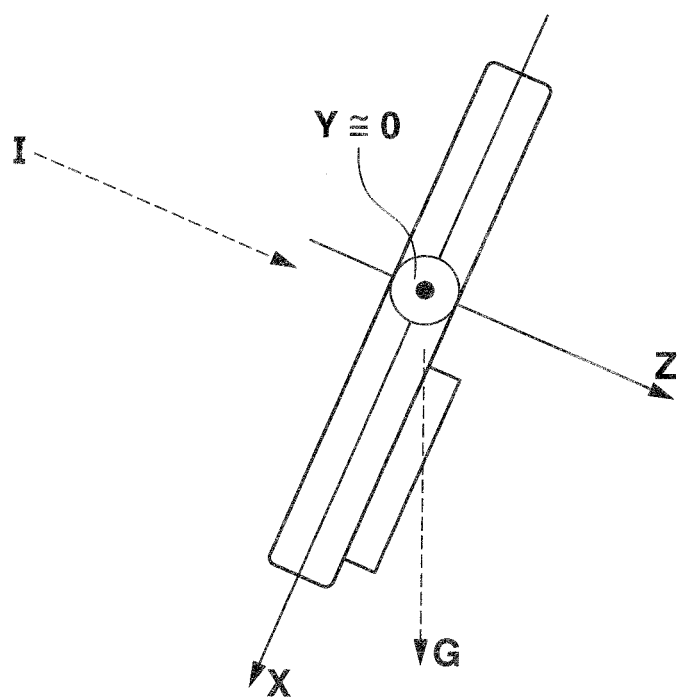

FIG. 5A and FIG. 5B show ordinary postures (hereinafter each referred to as a review check posture) in which the camera body 51 is supposed to be at the time of checking a review image. That is, FIG. 5A shows an example of the review check posture when the shooting posture is the horizontal position shooting. At this time, detection value X of the x-axis in the three axis acceleration information approximates to zero. FIG. 5B shows an example of the review check posture when the shooting posture is the vertical position shooting. At this time, detection value Y of the y-axis in the three axis acceleration information approximate zero. In the review check postures, the camera body faces forward and more or less downward, irrespective of the shooting postures. Arrows of broken lines denoted at I in FIG. 5A and FIG. 5B each indicate a line of user's sight.

The processing of Step SA9 described above is to determine whether or not the posture of the camera body 51 has changed to the review check posture shown in FIG. 5A or FIG. 5B. Accordingly, the threshold value Zf used as a determination reference in the processing of Step SA9 is expressed as a value below.

That is, the inclination angle of the z-axis to the gravitational direction is 90 degrees when the camera body 51 faces perfectly forward. For example, the threshold value is obtained by the following expression, provided that the review check posture is arranged to have an inclination angle of the z-axis not smaller than 45 degrees.

$$Zf = Gx \cos 45°$$

Thereafter, if the posture of the camera body 51 changes to the review check posture and the status thereof is detected to be stable before the elapsed time immediately from imaging reaches the predetermined check time (Step SA10: YES), the CPU 23 subsequently checks whether or not detection value X of the x-axis which has been obtained by the processing of Step SA8 performed immediately before approximates to zero (Step SA13). The processing of Step SA3 as described above is to determine whether or not the absolute value of detection value X to greater than a predetermined value and the x-axis is regarded as substantially corresponding to the horizontal line.

If detection value X approximates to zero (step SA13: YES), the CPU 23 specifies the posture of the camera body 51 to be the review check posture immediately after imaging was performed in the horizontal position shooting as shown in FIG. 5A, i.e., the shooting posture is specified to be the horizontal position shooting. The CPU 23 sets, as the angular field of view information to be added to the captured image data obtained by imaging for this time, "Landscape" indicating an angular field of view oriented to be horizontally long (step SA14).

If detection value X does not approximate to zero (step SA13: NO) like when detection value Y approximates to zero, i.e., if the CPU 23 determines the posture of the camera body 51 to be the review check posture immediately after imaging was performed in the vertical position shooting as shown in FIG. 5B, the CPU 23 specifies the shooting posture to be the vertical position shooting. The CPU 23 sets, as the angular field of view information to be added to the captured image data obtained by imaging for this time, "Portrait" indicating an angular field of view oriented to be vertically long (step SA15).

Otherwise, if the CPU 23 cannot detect that the posture of the camera body 51 has changed to the review check posture and the status thereof is stable before the time predetermined check time passes immediately from imaging, i.e., if timeout is determined (Step SA11: YES), the CPU 23 determines the shooting posture to be the horizontal position shooting which is most frequently used. The CPU 23 sets "Landscape" which is a default value as the angular field of view information added to the captured image data obtained by imaging for this time (step SA12).

By the series of processings as described above, the CPU 23 specifies the shooting posture of the camera body 51 at the time of imaging.

In the present embodiment, the acceleration component (detection value X) of the x-axis is acquired after imaging, and the shooting posture of the camera body 51 at the time of imaging is specified based on the acquired detection value X. Accordingly, even if the camera body 51 faced down or up at the time of imaging, the shooting posture can be more accurately specified to have been either the horizontal or vertical position shooting.

Besides, if the camera body 51 faces forward, the shooting posture at the time of imaging is configured to be specified based on the acceleration component (detection value X) of the x-axis, and the acceleration component (detection value Y) of the y-axis. Accordingly, either the horizontal or vertical position shooting can be specified accurately without difficulty even when the camera body 51 faces forward.

Particularly in present embodiment, if the camera body 51 faces down at the time of imaging, the shooting posture of the camera body 51 at the time of imaging is specified, based on the acceleration component (detection value X) of the x-axis, on condition that the camera body 51 is in the review check posture within the predetermined time after imaging. Accordingly, even if the camera body 51 faces down at the time of imaging, either horizontal or vertical position shooting can be specified much more accurately.

Further, on condition that the camera body 51 not only has changed to the review check posture but also can be determined to be stable in this status by a check, the shooting posture of the camera body 51 at the time of imaging is specified based on the acceleration component (detection value X) of the x-axis. Accordingly, even if the camera body 51 faces down at the time of imaging, either horizontal position shooting or vertical position shooting can be specified much more accurately.

In addition, specification of the shooting posture based on the acceleration component of the x-axis, on condition that the posture of the camera body 51 has changed to the review check posture, is performed when the camera body 51 can be determined to have faced down at the time of imaging. Accordingly, for example, if the camera body 51 faces forward at the time of imaging, the shooting posture at the time of imaging can be specified with the same accuracy as in the prior art.

In the present embodiment, if the camera body 51 cannot be determined to have changed to the review check posture within the predetermined time after imaging, the shooting posture is determined to be the horizontal, position shooting which is most frequently used. Therefore, even a case of incapable of specifying an accurate shooting posture can be supported. That is, whenever image data obtained by imaging is recorded, angular field of view information can be added to the image data.

Also, the present embodiment is configured to add, as information indicating a shooting posture at the time of imaging in the method as described above, angular field of view information which indicates a longitudinal direction and a width direction of an image to image data obtained by the imaging. Accordingly, accurate angular field of view information will be added to the image data obtained by imaging.

In the present embodiment, for convenience, the camera body 51 has been described to be determined to face down unless the camera body 51 faces forward at the time of imaging. However, according to the invention, the shooting posture can be more accurately specified when the camera body 51 faces up at the time of imaging, as well.

That is, the shooting posture can be also more accurately specified when the camera body 51 faces up at the time of imaging, only if the foregoing processing of Step SA3 is replaced with a processing of checking whether detection value Z of the z-axis approximates to the acceleration due to gravity G or not or whether detection value Z of the z-axis approximates to the acceleration due to gravity G.

Also in the present embodiment, either horizontal or vertical position shooting is specified by checking whether or not detection value X of the x-axis approximates to zero, in the processing of Steps SA13 to SA15. However, the processing as described can be substituted with a processing of specifying whether the shooting posture is the horizontal or the vertical position shooting by checking whether or not detection value Y of the y-axis approximates to zero. Further, the processing can be substituted with a processing of specifying whether the horizontal or vertical position shooting, based on a relationship in size between detection value X of the x-axis and detection value Y of the y-axis, as in the processing of Step SA4 to SA6.

Still also in the present embodiment, if detection value Z of the z-axis is smaller than the predetermined threshold value Zf in the processing of Step SA9, the camera body 51 is determined to have transited to the review check posture. However, the processing may be modified as follows. For example, arrival of timing to display a review image after imaging may be determined to be transition of the camera body 51 to a review check posture.

Also in the configuration as described above, even if the camera body 51 faces down (or up) at the time of imaging, either the horizontal or vertical position shooting can be specified more accurately.

Further, the camera body 51 may be determined to have transited to the review check posture both when detection value Z of the z-axis is smaller than the predetermined threshold value Zf and when the timing to display a review image comes. According to the configuration as described, the status of the camera body 51 in the review check posture can be more accurately determined. As a result, whether the shooting posture is the horizontal or vertical position shooting can be much more accurately specified.

In the present embodiment, information indicating an inclination of the x-axis to the horizontal line, information indicating an inclination of the y-axis to the perpendicular line, and information indicating an inclination of the z-axis to the perpendicular line are obtained by using the three axis acceleration sensor 7. However, the information as described may be obtained by using an arbitrary sensor other than the three axis acceleration sensor 7 or may be detected by any other method.

(Embodiment 2)

Next, the second embodiment of the invention will be described. The present embodiment relates to a digital camera which has the same configuration as described in the first embodiment.

Also in the digital camera according to the present embodiment, at the time of imaging, a CPU 23 specifies a shooting posture based on detection values of a three axis acceleration sensor 7 at a time point when or after a user presses a shutter key. However, unlike the first embodiment, the detection values of the three axis acceleration sensor 7 used in the present embodiment are an acceleration component (detection value X) of the x-axis and an acceleration component (detection value Y) of the y-axis only.

Also in the digital camera according to the present embodiment, when captured image data is stored as a still image file into a memory card 6, the still image file is added with angular field of view information indicating an angular field of view corresponding to an shooting posture of the camera body 51 at the time of imaging, i.e., a longitudinal direction and a width directions of an image obtained by the imaging.

Hereinafter, a detailed process of specifying the shooting posture in the present embodiment will be described with reference to FIG. 6. FIG. 6 shows a flowchart showing a processing to specify the shooting posture, which the CPU 23 performs in an imaging mode.

When the CPU 23 detects a press on the shutter key by a user in the imaging mode (Step SB1: YES), the CPU 23 performs imaging and registers firstly an initial value "not detected" as angular field of view information to be added to captured image data (Step SB2). The CPU 23 thereafter acquires two axis acceleration information (detection values: X and Y) from the three axis acceleration sensor 7 (Step 3).

Postures of the camera body 51 which can be determined directly from two axis acceleration information are those shown in FIG. 4, for example, forward horizontal position shooting (denoted at A in FIG. 4), and forward vertical position shooting (denoted at B in FIG. 4).

After obtaining two axis acceleration information, the CPU 23 checks whether both detection value X and detection value Y approximate to zero (Step SB4). The processing of Step B4 as described above is to determine whether or not the absolute values of detection values X and Y are not greater than a predetermined value, i.e., whether the absolute values are values from which both the x-axis and y-axis can be regarded as substantially corresponding to a horizontal line. In other words, whether or not the camera body 51 can be clearly determined to have faced down or up at the imaging time is checked.

If neither detection value X nor detection value Y approximates to zero and the camera body 51 cannot be determined to have faced down or up at the time of imaging (Step SB4: NO), the CPU 22 determines the camera body 51 to have faced forward at the time of imaging, performs an ordinary posture determination (as in the prior art), based on detection values X and Y, and performs a processing of registering (storing) a determination result thereof as angular field of view information (step SB5).

That is, in the processing of Step SB5, the CPU 23 performs the same processing as Steps SA4 to SA6 shown in FIG. 3 as in the first embodiment. More specifically, if the absolute value of detection value X is greater than the absolute value of detection value Y, the CPU 23 registers "Landscape" indicating an angular field of view oriented to be horizontally long, as the angular field of view information. Inversely, if the absolute value of detection value X is smaller than the absolute value of detection value Y, the CPU 23 registers "Portrait" indicating an angular field of view oriented to be vertically long, as the angular field of view information.

Thereafter, the CPU 23 starts review display by any other unillustrated processing upon completion of preparation for displaying a captured image at this time (Step SB6).

Meanwhile, if both detection values X and Y approximate to zero and the camera body 51 can therefore be clearly determined to have faced down or up at the time of imaging (Step SBA: YES), the CPU 23 starts the review display when preparation for display is completed for the captured image in this time, with the angular field of view information maintained at "not detected" (step SB6). The CPU 23 starts counting elapsed time after the review display by a timer function at the same time when the review display starts.

Further, if the registered angular field of view information is not "not detected" after starting the review display (Step SB7: NO), i.e., if the angular field of view information ("Landscape" or "Portrait") has been registered by the processing of Step SB5, the CPU 23 terminates the processing without changes. In this manner, the CPU 23 fixes the registered angular field of view information as the angular field of view information to be added to captured image data.

On the other side, the CPU 23 subsequently performs the following processing if the registered angular field of view information after starting the review display is still "not detect" (Step SB7: YES).

Firstly, the CPU 23 obtains again the two axis acceleration information (detection values: X and Y) (step SB8) from the three axis acceleration sensor 7, and checks whether or not both the newly obtained detection values X and Y approximate to zero (Step SB9).

If both the newly obtained detection values X and Y approximate to zero and the camera body 51 cannot clearly be determined to face down or up (Step SB9: NO), the CPU 23 determines the posture of the camera body 51 to have changed to face forward, performs an ordinary posture determination (as in the prior art), based on detection values X and Y, and performs a processing of registering (storing) a determination result thereof as angular field of view information (step SB10).

Further, the CPU 23 terminates the processing and fixes the registered angular field of view information as the angular field of view information to be added to captured image data.

Inversely, if both the newly obtained detection values X and Y approximate to zero and the camera body 51 can be determined to still face down (Step SB9: YES), the CPU 23 performs the processing below.

That is, until the elapsed time from the review display which has been started in the processing of Step SB6 reaches the end of a display period (for example, 2 to 3 seconds) of a review image (Step SB11: NO), the CPU 23 returns to the processing of Step SB8 after a definite waiting period (for example, 0.5 seconds) passes (step SB12).

Thereafter, the CPU 23 repeats the processing of Steps SB8 and SB9, until the review display ends, i.e., while the review display is performed.

If both the newly obtained detection values X and Y approximate to zero and the camera body 51 cannot clearly be determined to face down or up while the review display is performed (Step SB9: NO), the CPU 23 determines that the posture of the camera body 51 has changed to face forward, performs an ordinary posture determination (as in the prior art) based on detection values X and Y, and performs a processing of registering (storing) a determination result thereof as angular field of view information (Step SB10).

Further, the CPU 23 terminates the processing and fixes the registered angular field of view information as the angular field of view information to be added to captured image data.

Otherwise, if termination timing for terminating the review display comes while the processing of Steps SB8 and SB9 is repeated, the CPU 23 terminates the processing with the "not detected" maintained as the angular field of view Information (Step SB11: YES). That is, the CPU 23 fixes the "not detected" as angular field of view information added to captured image data.

Through the series of processings described above, the CPU 23 specifies the shooting posture of the camera body 51 at the time of imaging.

Further in the present embodiment, the acceleration component (detection value X) of the x-axis and the acceleration component (detection value Y) the y-axis are acquired after imaging, and the shooting posture of the camera body 51 at the time of imaging is specified based on the acquired detection values X and Y. Accordingly, even if the camera body 51 faced down or up at the time of imaging, the shooting posture can be more accurately specified to have been either horizontal or vertical position shooting.

In addition, as in the first embodiment, either horizontal or vertical position shooting can be specified accurately without difficulty even when the camera body 51 faced forward at the time of imaging.

Particularly in the present embodiment, if the camera body 51 faced down or up at the time of imaging, the acceleration component (detection value X) of the x-axis and the acceleration component (detection value Y) of the y-axis are repeatedly acquired while review display of a captured image is performed. The shooting posture of the camera body 51 at the time of imaging is specified, based on the acquired detection values X and Y.

Accordingly, even if the camera body 51 faced down or up at the time of imaging, the shooting posture can be much more accurately specified to have been either horizontal or vertical position shooting.

Also, the present embodiment is configured to add, to the image data obtained by imaging, angular field of view information indicating vertical and horizontal directions of an image, as information expressing a shooting posture at the time of imaging in the method as described above. Accordingly, accurate angular field of view information is added to the image data obtained by imaging.

Also in present embodiment, the shooting posture at the time of imaging is specified based on the two axis acceleration information (detection values: X and Y), on condition that the registered angular field of view information is "not detected" at the time point of starting the review display and the shooting posture has not been specified before the review display starts. Accordingly, reiterative processings for specifying the shooting posture at the time of imaging are prevented from being performed during the review display in spite of having already specified the shooting posture at the time of imaging.

Further in the present embodiment, acquisition of the two axis acceleration information (detection values: X and Y) is started to specify the shooting posture at the time of imaging after starting the review display. Accordingly, the shooting posture at the time of imaging can be specified at high accuracy, compared with a case of starting acquiring the two axis acceleration information (detection values: X and Y) before starting the review display (except timing immediately after imaging).

In the present embodiment, if the shooting posture of the camera body 51 at the time of imaging cannot be specified before the review display of a captured image is terminated, "not detected" is set as the angular field of view information to be added to the captured image data. However, if the shooting posture cannot be specified, the shooting posture may be determined to have been the horizontal position shooting which is most frequently used, and a default value "Landscape" may be set as angular field of view information to be added to the captured image data.

For convenience, the present embodiment has been described with respect to a configuration of obtaining the acceleration components of the x-axis and the y-axis by using the three axis acceleration sensor 7. However, the three axis acceleration sensor 7 may be of course substituted with a sensor which can detect only the acceleration components of the x-axis and the y-axis.

Further, the three axis acceleration sensor 7 may be substituted with any arbitrary sensor other than an acceleration sensor insofar as the sensor can obtain information indicating an inclination of the x-axis to the horizontal line, and information indicating an inclination of the y-axis to the perpendicular line.

In the configuration comprising the three axis acceleration sensor 7 as in the present embodiment, the processing of Steps SB4 and SB9 described above can be substituted with the processing of Step SA3 (refer to FIG. 3) described in the first embodiment.

The present embodiment has been described with respect to the configuration in which the digital camera automatically displays a review of a captured image for a definite time period immediately after imaging. However, the invention is effective even in a configuration in which review display of a captured image is started and terminated upon a predetermined key operation by a user (photographer).

In this case, the CPU 23 may be caused to perform a processing in which a duration of review display is regarded to be from when start time of review display is instructed by a user to when termination of review display is instructed. That is, the CPU 23 may be caused to sequentially check presence or absence of a termination instruction for review display after starting the review display, and to repeatedly perform the processing of Steps SB4 and SB9 until a termination instruction for the review display issues.

Several embodiments of the invention and modifications thereof have been described above. The embodiments and modifications may be appropriately modified within a scope in which operations and effects of the invention are achieved. Such modified embodiments are covered by the scope of the invention as claimed hereunder and equivalences to the invention.

While the present invention has been described with reference to the preferred embodiments, it is intended that the invention be not limited by any of the details of the description therein hot includes all the embodiments which fall within the scope of the appended claims.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A shooting posture specifying method for an imaging apparatus including an imaging unit, an optical axis information detecting unit that detects, with a sensor, optical axis information indicating an inclination of the optical axis of the imaging unit, and an orthogonal axis information detecting unit that detects, with the sensor, orthogonal axis information indicating an inclination of an orthogonal axis perpendicular to the optical axis, the method comprising:

executing imaging by the imaging unit; and specifying a shooting posture of an apparatus body at a time of imaging to be a vertical position shooting or a horizontal position shooting, based on the detected orthogonal axis information, on condition that the optical axis information indicating a predetermined inclination, from which the apparatus body can be determined to be in a particular posture, is detected by the optical axis information detecting unit, after the imaging by the imaging unit, wherein the inclination indicated by the orthogonal axis information which is detected by the orthogonal axis information detecting unit is independent from the inclination indicated by optical axis information which is detected by the optical axis information detecting unit,
wherein the specifying comprises specifying the shooting posture of the apparatus body at the time of the imaging before a posture change to be the vertical position shooting, in a case where the inclination which is detected after the posture change and indicated by the orthogonal axis information is greater than a predetermined inclination at which the orthogonal axis can be regarded as substantially corresponding to a horizontal line.

2. The method according to claim 1, wherein orthogonal axis information indicating an inclination of the orthogonal axis, which is perpendicular to the optical axis of the imaging unit and is horizontal or perpendicular to the imaging apparatus, to at least one of a horizontal line and a perpendicular line, is detected by the orthogonal axis information detecting unit after the imaging by the imaging unit.

3. The method according to claim 1, wherein the shooting posture of the apparatus body at the time of imaging is specified, on condition that a change of the optical axis information, from which the apparatus body can be determined to have turned the optical axis from a posture of facing down toward a posture of facing forward, is detected.

4. The method according to claim 1, wherein:
information indicating an inclination of an orthogonal axis, which is perpendicular to the optical axis and corresponds to a width direction of an angular field of view, to the horizontal line, is detected as the orthogonal axis information by the orthogonal axis information detecting unit, and
the specifying comprises specifying the shooting posture of the apparatus body at the time of the imaging before the posture change to be the horizontal position shooting, in a case where the inclination which is indicated by the orthogonal axis information detected after the posture change is not greater than the predetermined inclination at which the orthogonal axis can be regarded as substantially corresponding to the horizontal line.

5. The method according to claim 1, wherein the specifying comprises specifying the shooting posture of the apparatus body at the time of the imaging before the posture change to be the horizontal position shooting, in a case where the inclination which is indicated by the orthogonal axis information detected after the posture change is greater than a predetermined inclination at which the orthogonal axis can be regarded as substantially corresponding to a perpendicular line.

6. The method according to claim 1, wherein a review display is performed after the imaging.

7. The method according to claim 6, further comprising determining whether or not a current operation status indicates that the review display is currently performed, wherein the orthogonal axis information indicating the inclination in a case where the current operation status indicates that the review display is currently performed, is detected by the orthogonal axis information detecting unit.

8. The method according to claim 6, wherein the orthogonal axis information is detected by the orthogonal axis information detecting unit during the review display, and the shooting posture is specified, on condition that the shooting posture has not been specified before the review display is started.

9. The method according to claim 6, wherein the detecting of the orthogonal axis information by the orthogonal axis information detecting unit is started after the review display is started.

10. A shooting posture specifying method for an imaging apparatus including an imaging unit, an optical axis information detecting unit that detects, with a sensor, optical axis information indicating an inclination of the optical axis of the imaging unit, and an orthogonal axis information detecting unit that detects, with the sensor, orthogonal axis information indicating an inclination of an orthogonal axis perpendicular to the optical axis, the method comprising:
executing imaging by the imaging unit; and
specifying a shooting posture of an apparatus body at a time of imaging to be a vertical position shooting or a horizontal position shooting, based on the detected orthogonal axis information, on condition that the optical axis information indicating a predetermined inclination, from which the apparatus body can be determined to be in a particular posture, is detected by the optical axis information detecting unit, after the imaging by the imaging unit, wherein the inclination indicated by the orthogonal axis information which is detected by the orthogonal axis information detecting unit is independent from the inclination indicated by optical axis information which is detected by the optical axis information detecting unit,
wherein:
information indicating an inclination of an orthogonal axis, which is perpendicular to the optical axis and corresponds to a longitudinal direction of an angular field of view, to a perpendicular line, is detected as the orthogonal axis information by the orthogonal axis information detecting unit, and
the specifying comprises specifying the shooting posture of the apparatus body at the time of the imaging before a posture change to be the vertical position shooting, in a case where the inclination which is indicated by the orthogonal axis information detected after the posture change is not greater than a predetermined inclination at which the orthogonal axis can be regarded as substantially corresponding to the perpendicular line.

11. A shooting posture specifying method for an imaging apparatus including an imaging unit, an optical axis information detecting unit that detects, with a sensor, optical axis information indicating an inclination of the optical axis of the imaging unit, and an orthogonal axis information detecting unit that detects, with the sensor, orthogonal axis information indicating an inclination of an orthogonal axis perpendicular to the optical axis, the method comprising:
executing imaging by the imaging unit; and
specifying a shooting posture of an apparatus body at a time of imaging to be a vertical position shooting or a horizontal position shooting, based on the detected orthogonal axis information, on condition that the optical axis information indicating a predetermined inclination, from which the apparatus body can be determined to be in a particular posture, is detected by the optical axis information detecting unit, after the imaging by the imaging unit, wherein the inclination indicated by the orthogonal axis information which is detected by the orthogonal axis information detecting unit is independent from the inclination indicated by optical axis information which is detected by the optical axis information detecting unit,
wherein:
both of information indicating an inclination of a first orthogonal axis, which is perpendicular to the optical axis and corresponds to a width direction of an angular as field of view, to a horizontal line, and information indicating an inclination of a second orthogonal axis, which is perpendicular to the optical axis and corresponds to a longitudinal direction of the angular field of view, to a perpendicular line, is detected as the orthogonal axis information by the orthogonal axis information detecting unit, and the specifying comprises specifying the shooting posture of the apparatus body at the time of imaging before a posture change, in accordance with a relationship in size between the inclination of the first orthogonal axis to the horizontal line and the inclination of the second orthogonal axis to the perpendicular line, which are indicated by the orthogonal axis information detected after the posture change.

12. The method according to claim 11, wherein the specifying comprises specifying the shooting posture of the apparatus body at the time of imaging before the posture change to be the vertical position shooting in a case where the inclination of the first orthogonal axis to the horizontal line, which is indicated by the orthogonal axis information detected after the posture change, is greater than the inclination of the second orthogonal axis to the perpendicular line.

13. A shooting posture specifying method for an imaging apparatus including an imaging unit, an optical axis information detecting unit that detects, with a sensor, optical axis information indicating an inclination of the optical axis of the imaging unit, and an orthogonal axis information detecting unit that detects, with the sensor, orthogonal axis information indicating an inclination of an orthogonal axis perpendicular to the optical axis, the method comprising:

executing imaging by the imaging unit; and specifying a shooting posture of an apparatus body at a time of imaging to be a vertical position shooting or a horizontal position shooting, based on the detected orthogonal axis information, on condition that the optical axis information indicating a predetermined inclination, from which the apparatus body can be determined to be in a particular posture, is detected by the optical axis information detecting unit, after the imaging by the imaging unit, wherein the inclination indicated by the orthogonal axis information which is detected by the orthogonal axis information detecting unit is independent from the inclination indicated by optical axis information which is detected by the optical axis information detecting unit, wherein the specifying comprises specifying the shooting posture of the apparatus body at the time of imaging, based on the orthogonal axis information detected by the orthogonal axis information detecting unit, on condition that the optical axis information indicating an inclination within a predetermined range, from which the apparatus body can be determined to be in a particular posture, is stably detected by the optical axis information detecting unit within a predetermined time period from the imaging.

14. A shooting posture specifying method for an imaging apparatus including an imaging unit, an optical axis information detecting unit that detects, with a sensor, optical axis information indicating an inclination of the optical axis of the imaging unit, and an orthogonal axis information detecting unit that detects, with the sensor, orthogonal axis information indicating an inclination of an orthogonal axis perpendicular to the optical axis, the method comprising:

executing imaging by the imaging unit;

specifying a shooting posture of an apparatus body at a time of imaging to be a vertical position shooting or a horizontal position shooting, based on the detected orthogonal axis information, on condition that the optical axis information indicating a predetermined inclination, from which the apparatus body can be determined to be in a particular posture, is detected by the optical axis information detecting unit, after the imaging by the imaging unit, wherein the inclination indicated by the orthogonal axis information which is detected by the orthogonal axis information detecting unit is independent from the inclination indicated by optical axis information which is detected by the optical axis information detecting unit; and wherein the shooting posture is specified to be a predetermined posture in a case where the optical axis information indicating an inclination within a predetermined range, from which the apparatus body can be determined to be in a particular posture, is not stably detected by the optical axis information detecting unit within a predetermined time period from the imaging.

15. A shooting posture specifying method for an imaging apparatus including an imaging unit, an optical axis information detecting unit that detects, with a sensor, optical axis information indicating an inclination of the optical axis of the imaging unit, and an orthogonal axis information detecting unit that detects, with the sensor, orthogonal axis information indicating an inclination of an orthogonal axis perpendicular to the optical axis, the method comprising:

executing imaging by the imaging unit;

specifying a shooting posture of an apparatus body at a time of imaging to be a vertical position shooting or a horizontal position shooting, based on the detected orthogonal axis information, on condition that the optical axis information indicating a predetermined inclination, from which the apparatus body can be determined to be in a particular posture, is detected by the optical axis information detecting unit, after the imaging by the imaging unit, wherein the inclination indicated by the orthogonal axis information which is detected by the orthogonal axis information detecting unit is independent from the inclination indicated by optical axis information which is detected by the optical axis information detecting unit; and detecting a start of displaying a review image after the imaging;

wherein the specifying comprises specifying the shooting posture of the apparatus body at the time of imaging, based on the orthogonal axis information detected by the orthogonal axis information detecting unit, on a condition that the optical axis information indicating a predetermined inclination, from which the apparatus body can be determined to be in a particular posture, is detected by the optical axis information detecting unit when the start of display of the review image is detected.

16. A shooting posture specifying method for an imaging apparatus including an imaging unit, an optical axis information detecting unit that detects, with a sensor, optical axis information indicating an inclination of the optical axis of the imaging unit, and an orthogonal axis information detecting unit that detects, with the sensor, orthogonal axis information indicating an inclination of an orthogonal axis perpendicular to the optical axis, the method comprising:

executing imaging by the imaging unit; and specifying a shooting posture of an apparatus body at a time of imaging to be a vertical position shooting or a horizontal position shooting, based on the detected orthogonal axis information, on condition that the optical axis information indicating a predetermined inclination, from which the apparatus body can be determined to be in a particular posture, is detected by the optical axis information detecting unit, after the imaging by the imaging unit, wherein the inclination indicated by the orthogonal axis information which is detected by the orthogonal axis information detecting unit is independent from the inclination indicated by optical axis information which is detected by the optical axis information detecting unit;

wherein the specifying comprises specifying the shooting posture of the apparatus body at the time of imaging, based on the orthogonal axis information detected by the orthogonal axis information detecting unit, on condition that the optical axis information indicating an inclination not greater than a predetermined inclination, at which the optical axis can be regarded as substantially corresponding to a perpendicular line, is detected by the optical axis Information detecting unit, and that the optical axis information indicating a predetermined inclination within a predetermined range, from which the apparatus body can be determined to be in a particular posture, is detected by the optical axis information detecting unit within a predetermined time period from the imaging.

\* \* \* \* \*